United States Patent
Huang

(12) 
(10) Patent No.: US 6,345,446 B1
(45) Date of Patent: Feb. 12, 2002

(54) ON GARDENING SHEARS

(76) Inventor: Shoei-Shin Huang, No. 668, Sec. 4., Yen Hai Rd., Fu Shing Hsian, Chang Hua Hsien (TW)

( * ) Notice: Subject to any disclaimer, the term of this patent is extended or adjusted under 35 U.S.C. 154(b) by 0 days.

(21) Appl. No.: 09/572,092

(22) Filed: May 17, 2000

(51) Int. Cl.[7] .............................................. B26B 13/00
(52) U.S. Cl. .......................................... 30/250; 30/192
(58) Field of Search .......................... 30/245, 249, 250, 30/252, 191, 192

(56) References Cited

U.S. PATENT DOCUMENTS

| | | | |
|---|---|---|---|
| 397,698 A | * 2/1889 | Cooper | 30/250 |
| 508,022 A | * 11/1893 | Kamphaus | 30/250 |
| 1,897,532 A | * 2/1933 | Pitcher | 30/192 |
| 5,570,510 A | * 11/1996 | Linden | 30/250 |
| 5,689,888 A | * 11/1997 | Linden | 30/250 |

* cited by examiner

*Primary Examiner*—Hwei-Siu Payer
(74) *Attorney, Agent, or Firm*—Browdy and Neimark

(57) ABSTRACT

A pair of gardening shears comprises a fixed jaw and a movable jaw pivoted together with the fixed jaw. The movable jaw is fastened with a connection arm and provided with a first toothed transmission portion. The fixed jaw is pivoted at one end with a rocking arm which is provided with a second toothed transmission portion meshing with the first transmission portion. The connection arm is provided with a protective portion for shielding the first and the second transmission portions such that the twigs or leaves of a garden plant are prevented from being caught and deposited in the toothed transmission portions.

4 Claims, 4 Drawing Sheets

ON GARDENING SHEARS

FIELD OF THE INVENTION

The present invention relates generally to a gardening implement, and more particularly to a pair of gardening shears.

BACKGROUND OF THE INVENTION

As shown in FIG. 1, a pair of gardening shears of the prior art comprises a first tool body 1 which has a cutting portion 101 and a handle body 102. The first tool body 1 is provided with a pivoting point 2 for pivoting a blade piece 401 which is provided in the lower end with a pivoting point 3 for pivoting a handle body 402. The blade piece 401 and the handle body 402 form a second tool body 4. The handle body 102 of the first tool body 1 and the handle body 402 of the second tool body 4 are connected with a handle 5, 6. The tool 1 is provided with a sector gear 103. The second tool 4 is provided at the top of the handle body 402 with a sector gear 403.

The prior art pair of gardening shears is defective in design in that the twigs or leaves are easily caught between the sector gears 103 and 403. As a result, the sector gears 103 and 403 fail to mesh with each other completely, thereby shortening the service life span of the prior art gardening shears.

SUMMARY OF THE INVENTION

The primary objective of the present invention is to provide a pair of gardening shears free from the drawbacks of the prior art gardening shears described above.

The pair of gardening shears of the present invention comprises a fixed jaw, a movable jaw, a rocking arm, and a connection arm. The fixed jaw and the movable jaw are pivoted together. The fixed jaw is pivoted at the lower end with the rocking arm. The movable jaw is connected with the connection arm. The movable jaw is provided with a first transmission portion. The rocking arm is provided with a second transmission portion which is engaged with the first transmission portion. The connection arm is provided with a protective portion for shielding the first transmission portion and the second transmission portion, which are thus free from interference by the twigs or leaves of a garden plant being pruned by the gardening shears of the present invention. The protective portion is provided with a see-through hole to facilitate the inspecting of the state of the engagement of the first transmission portion with the second transmission portion.

DETAILED DESCRIPTION OF THE INVENTION

Figure 1:
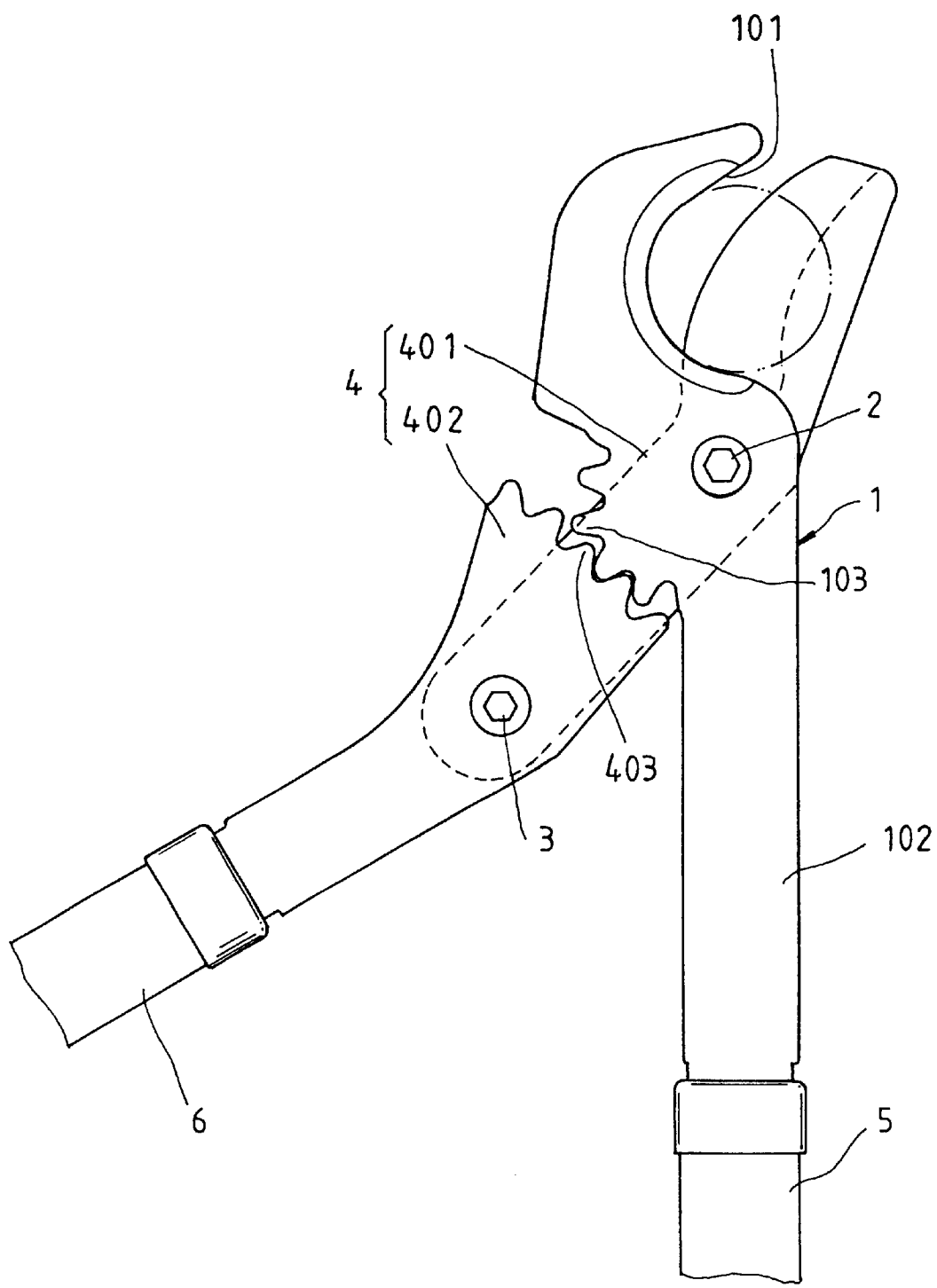
FIG. 1 shows a schematic plan view of a pair of gardening shears of the prior art.
Figure 2:
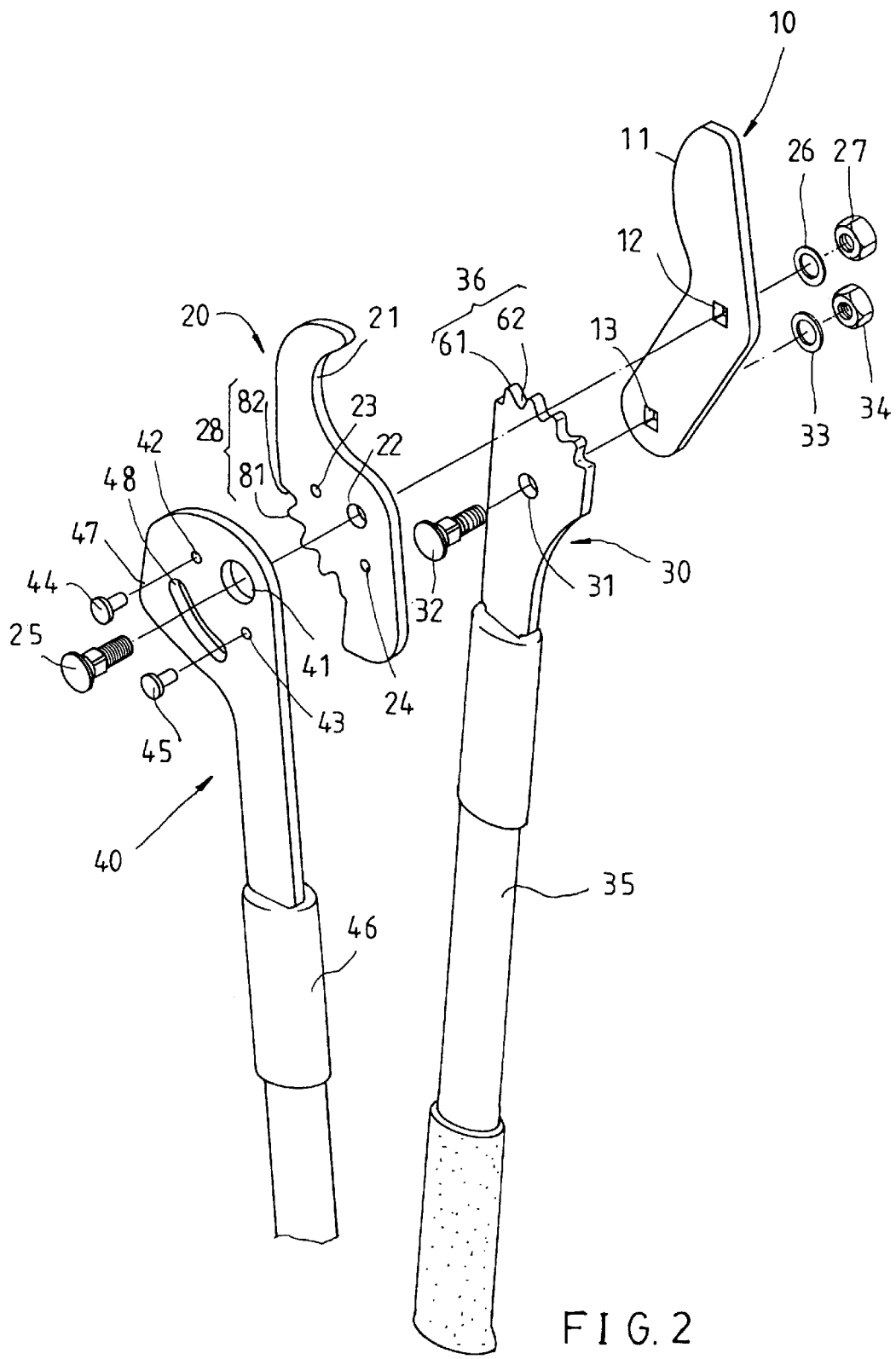
FIG. 2 shows an exploded view of a pair of gardening shears of the present invention.
Figure 3:
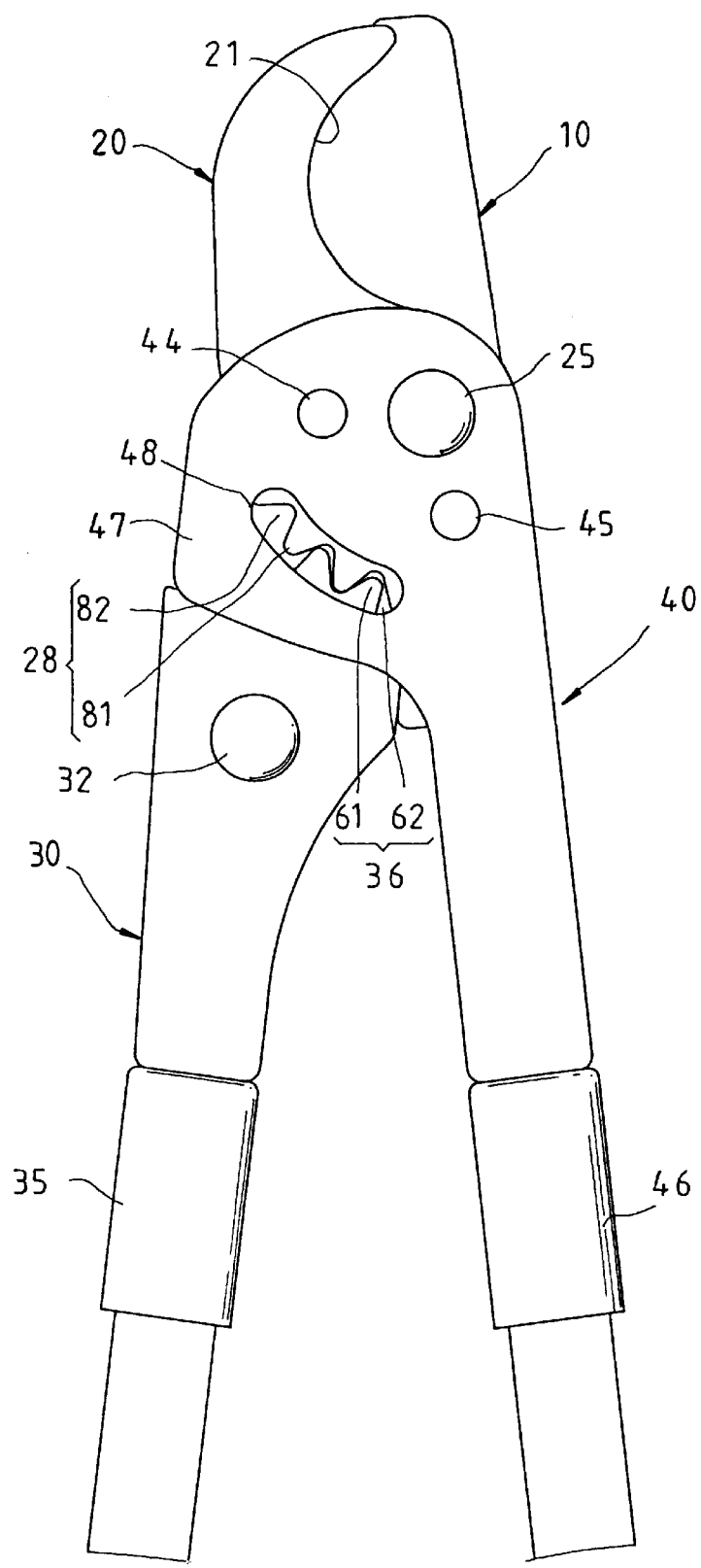
FIG. 3 shows a schematic plan view of the present invention in combination.
Figure 4:
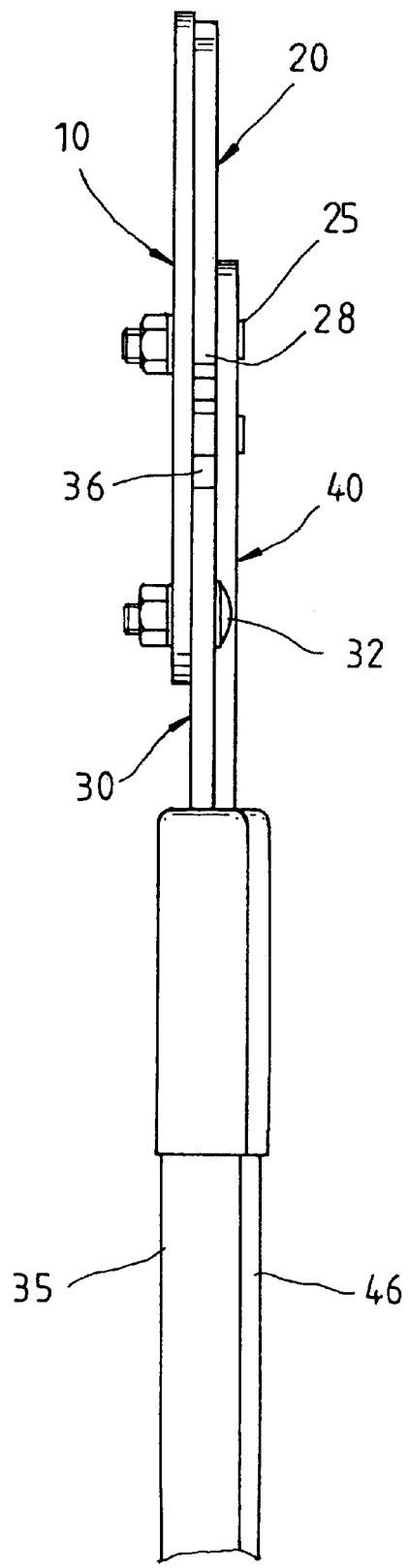
FIG. 4 shows a side schematic view of the present invention in combination.

As shown in FIGS. 2–4, a pair of gardening shears of the present invention comprises a fixed jaw 10, a movable jaw 20, a rocking arm 30, and a connection arm 40.

The fixed jaw 10 is provided in the upper end with a cutting portion 11, in the midsegment with a pivot hole 12, and in the lower end with a pivoting hole 13.

The movable jaw 20 is provided in the upper end with a cutting portion 21 cooperative with the cutting portion 11 of the fixed jaw 10. The movable jaw 20 is provided in the midsegment with a pivot hole 22 and two round holes 23 and 24. The movable jaw 20 is pivoted with the fixed jaw 10 by a pivot 25 which is engaged with a nut 27 via the pivot holes 22 and 12 in conjunction with a washer 26. The movable jaw 20 is provided in the midsegment with a first transmission portion 28 which is formed of a plurality of teeth 81 and grooves 82.

The rocking arm 30 is provided in the midsegment with a pivoting hole 31. The rocking arm 30 is pivoted with the fixed jaw 10 by a pivot 32 which is engaged with a nut 34 in conjunction with a washer 33 via the pivoting holes 13 and 31. The rocking arm 30 is fastened at the bottom end with a handle 35 and is provided at the top end with a second transmission portion 36, which is provided with a plurality of teeth 61 and grooves 62. The second transmission portion 36 is engaged with the first transmission portion 28.

The connection arm 40 is provided in the upper end with a pivoting hole 41 and two round holes 42 and 43. The connection arm 40 is pivoted with the fixed jaw 10 and the movable jaw 20 by the pivot 25 which is also received in the pivoting hole 41. The connection arm 40 is fastened with the movable jaw 20 by two rivets 44 and 45, which are received in the round holes 23 and 24 of the movable jaw 20 and the round holes 42 and 43 of the connection arm 40. The movable jaw 20 is actuated by the connection arm 40 which is fastened at the bottom end with a handle 46. The connection arm 40 is provided with a protective portion 47 extending to shield the first transmission portion 28 of the movable jaw 20 and the second transmission portion 36 of the rocking arm 30. The protective portion 47 is provided with a see-through hole 48 through which the user of the present invention can inspect with the naked eye the state of engagement of these two transmission portions 28 and 36.

The connection arm 40 may be fastened with the movable jaw 20 by soldering, or bolts in place of the rivets 44 and 45.

In operation, the first and the second transmission portions 28 and 36 are shielded by the protective portion 47 of the connection arm 40, thereby preventing the twigs or leaves of a garden plant from being caught and deposited in the grooves 82 and 62 of the first and the second transmission portions 28 and 36. In addition, the protective portion 47 and the fixed jaw 10 cooperate to bring about a better clamping effect capable of minimizing the deformation of the teeth of the transmission portions, thereby prolonging the service life span of the present invention.

What is claimed is:

1. A pair of gardening shears comprising:
    a fixed jaw provided in an upper end with a cutting portion;
    a movable jaw pivoted with said fixed jaw and provided with a toothed first transmission portion, said movable jaw further provided in an upper end thereof with a cutting portion;
    a rocking arm pivoted with a lower end of said fixed jaw and fastened at a bottom end with a handle, said rocking arm further provided with a toothed second transmission portion whereby said second transmission portion is engaged with said first transmission portion of said movable jaw; and a connection arm fastened at an upper end with said movable jaw, and at a lower end with a handle;

wherein said connection arm is provided in a midsegment with a coplanar protective portion which extends over said first transmission portion of said movable jaw and said second transmission portion of said rocking arm for protection;

wherein said protective portion is provided with a through hole to facilitate the inspecting of the state of engagement of said two transmission portions by a user of the gardening shears.

2. The pair of gardening shears as defined in claim 1, wherein said connection arm and said movable jaw are fastened together by a plurality of rivets.

3. The pair of gardening shears as defined in claim 1, wherein said connection arm and said movable jaw are fastened together by a plurality of bolts.

4. The pair of gardening shears as defined in claim 1, wherein said connection arm and said movable jaw are fastened together by soldering.

* * * * *